United States Patent [19]
Fricker et al.

[11] 3,729,651
[45] Apr. 24, 1973

[54] VOLTAGE REGULATOR

[75] Inventors: David C. Fricker, Hurst; Thomas F. Whittaker, Fort Worth, both of Tex.

[73] Assignee: ECC Corporation, Euless, Tex.

[22] Filed: Apr. 7, 1971

[21] Appl. No.: 131,981

[52] U.S. Cl. ............317/16, 307/252 B, 307/252 N, 307/311, 317/33 SC, 323/8, 323/21, 323/24
[51] Int. Cl. .............................................. G05f 1/44
[58] Field of Search ....................317/16, 31, 33 SC; 323/8, 9, 22 SC, 24, 21; 307/311, 252 B, 252 N, 252 T; 250/214 R, 214 D

[56] References Cited

UNITED STATES PATENTS

| | | | |
|---|---|---|---|
| 3,310,687 | 3/1967 | Howell | 323/8 X |
| 3,478,222 | 11/1969 | Gassaway et al. | 323/8 |
| 3,483,429 | 12/1969 | Engel et al. | 307/311 X |
| 3,539,892 | 11/1970 | Lindberg | 323/21 X |
| 3,539,865 | 11/1970 | Billings | 317/16 |
| 3,440,515 | 4/1969 | Swartz | 323/8 X |
| 3,548,290 | 12/1970 | Swinehart | 323/24 X |
| 3,573,604 | 4/1971 | Lundgreen | 323/22 SC X |
| 3,500,455 | 3/1970 | Ross et al. | 323/21 |
| 3,551,787 | 12/1970 | Walters | 323/24 X |
| 3,551,745 | 12/1970 | Nicholas | 317/16 |

Primary Examiner—Gerald Goldberg
Attorney—Giles C. Clegg, Jr., Jack A. Kanz and Richard E. Bee

[57] ABSTRACT

A semiconductor switching device is connected in shunt with an alternating voltage source to be regulated. A root-mean-square voltage sensing mechanism is coupled in shunt with the voltage source. A semiconductor breakover device is coupled between the voltage sensing mechanism and the gate electrode of the switching device for controlling the triggering of the switching device and thereby regulating the root-mean-square value of the voltage supplied to a load connected in shunt with the voltage source.

13 Claims, 6 Drawing Figures

Patented April 24, 1973 3,729,651

VOLTAGE REGULATOR

BACKGROUND OF THE INVENTION

This invention relates to a voltage regulator for use with alternating voltage sources having a substantial source impedance under short circuit conditions. The invention is particularly useful in connection with magneto type voltage generators driven by variable speed internal combustion motors.

Various types of smaller sized passenger carrying vehicles such as, for example, motorcycles, trail bikes, snowmobiles, garden tractors and the like employ magneto type voltage generators for generating the vehicle ignition voltage. Where such vehicles are equipped with headlights, tail lights, brake lights, horns and the like, it is common practice to also use the magneto generated voltage to operate these auxiliary devices. Unfortunately, this gives rise to certain problems. The source of such problems is the fact that the output voltage of a magneto will vary over a relatively wide range as the speed of the vehicle motor is varied. As a consequence, it is difficult to provide headlights, tail lights and the like which give desired brightness levels at lower operating speeds and yet which are not damaged or blown out of the larger voltages which occur at the higher operating speeds.

One possible solution would be to employ some form of voltage limiting device for preventing the peak value of the magneto output voltage from exceeding some arbitrary voltage level. It has been found, however, that this solution does not provide entirely satisfactory results. For one thing, the lights do not provide the desired brightness at all the different operating speeds. It was also found that this solution caused a noticeable flickering of the lights at some operating speeds.

It is an object of the invention, therefore, to provide a new and improved voltage regulator for alternating voltage sources having a substantial source impedance under short circuit conditions and having an output voltage which tends to vary over a relatively wide range.

It is another object of the invention to provide a new and improved voltage regulator which is especially adapted for use with a magneto type voltage generator driven by a variable speed motor.

For a better understanding of the present invention, together with other and further objects and features thereof, reference is had to the following description taken in connection with the accompanying drawing, the scope of the invention being pointed out in the appended claims.

BRIEF DESCRIPTION OF THE DRAWING

Referring to the drawing.

DESCRIPTION OF THE ILLUSTRATED EMBODIMENT

Figure 1:
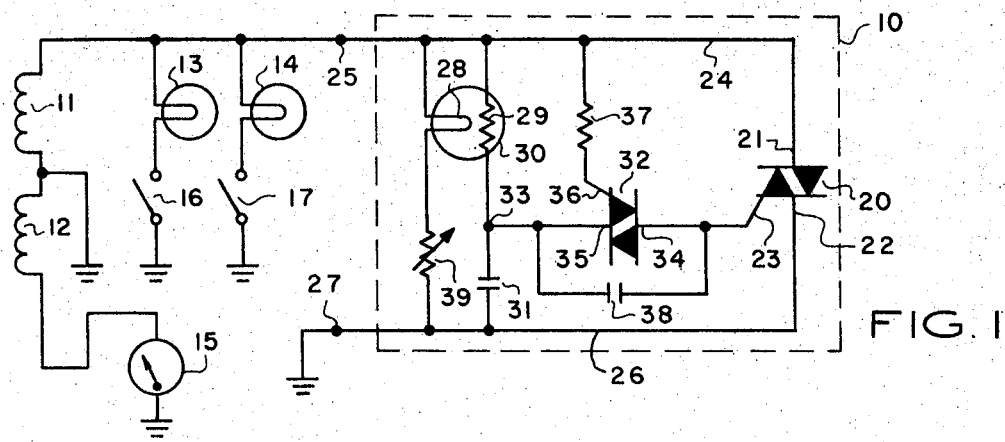
FIG. 1 is a schematic circuit diagram showing a first embodiment of a voltage regulator constructed in accordance with the present invention.

Referring to FIG. 1, there is shown a voltage regulator 10 for an alternating voltage source having a substantial source impedance under short circuit conditions. The voltage source is represented by windings 11 and 12 which represent the field windings of a magneto type voltage generator. The permanent magnet rotor (not shown) of the magneto is mechanically coupled to the motor of a motor vehicle. Both the amplitude and the frequency of the voltages induced across magneto windings 11 and 12 vary with the speed of operation of the vehicle motor. The motor vehicle may take the form of, for example, a motorcycle, trail bike, snowmobile, garden tractor or the like. Typical auxiliary devices on the motor vehicle are represented by a headlight 13, a tail light 14 and a tachometer 15. Lights 13 and 14 are provided with switches 16 and 17, respectively, for turning same on and off.

The voltage regulator 10 is a shunt type voltage regulator which, in use, is connected in shunt across the magneto winding 11 for purposes of protecting the vehicle lights 13 and 14, while at the same time enabling sufficient electrical power to be supplied thereto for purposes for providing the desired lamp brightness levels. As will be seen, the voltage regulator 10 periodically places a short circuit across the voltage source represented by the magneto winding 11. Consequently, such voltage source must have sufficient internal impedance such that the current flow under short circuit conditions will not damage the source. In the case of a magneto, this relatively high internal impedance under short circuit conditions is provided by the field limiting effect which takes place therein.

The voltage regulator 10 includes a semiconductor bilateral switching device 20 having a pair of power electrodes 21 and 22 and a control electrode or gate electrode 23. The switching device 20 is connected by its power electrodes 21 and 22 in shunt with the voltage source to be regulated, namely, the magneto winding 11. This is accomplished by a pair of connector means, one of which is represented by a conductor 24 and an output terminal 25 and the other of which is represented by a conductor 26 and an output terminal 27. Where the lower end of winding 11 is grounded to the vehicle chassis, the lower terminal 27 may likewise be grounded to the vehicle chassis, this being the case illustrated in the drawing.

The voltage regulator 10 also includes root-mean-square (R.M.S.) voltage sensing means coupled in shunt with the power electrodes 21 and 22 of the switching device 20 for developing a control effect which is proportional to the R.M.S. value of the alternating voltage developed across the magneto winding 11. This R.M.S. voltage sensing means includes an electrically responsive radiant energy producing means coupled in shunt with the power electrodes 21 and 22 of the switching device 20. In the illustrated embodiment, this radiant energy producing means is represented by an incandescent lamp filament 28. The R.M.S. voltage sensing means further includes time constant circuit means coupled in shunt with the power electrodes 21 and 22 of the switching device 20. This time constant circuit means includes radiant energy responsive variable impedance means represented by a photocell or photosensitive resistor 29. Photosensitive resistor 29 is placed in intimate proximity with the filament 28 so that it receives substantially all of the light produced by such filament 28. Photosensitive resistor 29 has an operating characteristic such that its resistance decreases as the brightness of the filament 28 increases and vice versa. Filament 28 and Photosensitive resistor 29 are encased in a light-tight protective cover 30. The time constant circuit means further includes a capacitor 31 connected in series with the photosensitive resistor 29.

The voltage regulator 10 further includes a semiconductor breakover device 32 coupled between the junction point 33 of the time constant circuit means and the gate electrode 23 of the switching device 20. Breakover device 32 is a semiconductor switching device having a negative resistance characteristic. In the illustrated embodiment, the breakover device 32 take the form of a silicon bilateral switching device. As such, it includes a pair of power electrodes 34 and 35 and a control electrode or gate electrode 36. Power electrode 35 is connected to the junction point 33 of the time constant circuit means and power electrode 34 is connected to the gate electrode 23 of the switching device 20. The gate electrode 36 is coupled by way of a resistor 37 and conductor 24 to the upper power electrode 21 of the switching device 20. A capacitor 38 is shunted across the power electrodes 34 and 35 of the breakover device 32 for minimizing spurious triggering of the breakover device 32 by noise impulses and the like.

The voltage regulator 10 also includes an adjustable resistor 39 connected in series with the incandescent lamp filament 28 for enabling adjustment of the set point of the voltage regulator 10. In other words, adjustment of the resistor 39 adjusts the R.M.S. value at which the voltage across magneto winding 11 is held by the regulator 10.

Considering now the operation of the voltage regulator 10, such regulator 10 is a shunt type regulator and the bilateral switching device 20 serves to place a short circuit across the magneto winding 11 for a controlled fraction of each half cycle of the alternating-current voltage developed across the winding 11. An important aspect of the present invention is the recognition of the fact that it is the root-mean-square (R.M.S.) value of the magneto voltage which should be regulated. The fraction of each half cycle during which the switching device 20 is conductive is controlled in accordance with such R.M.S. value. This protects the vehicle lamps 13 and 14, while providing the best lamp brightness levels under the circumstances at hand. This is because it is the R.M.S. value which determines both the power dissipated in the vehicle lamps 13 and 14 and the brightness of such lamps.

The incandescent lamp filament 28 produces light having a brightness level which is proportional to the R.M.S. value of the voltage across magneto winding 11. The brightness level of filament 28 determines the resistance of the photosensitive resistor 29. The resistance of resistor 29 decreases as the brightness of the filament 28 increases. This decreases the time constant of the time constant circuit means formed by resistor 29 and capacitor 31. As will be seen, this increases the fraction of each half cycle during which switching device 20 is conductive, thus reducing the R.M.S. value of the voltage appearing across the output terminals of the magneto winding 11.

Figure 2:
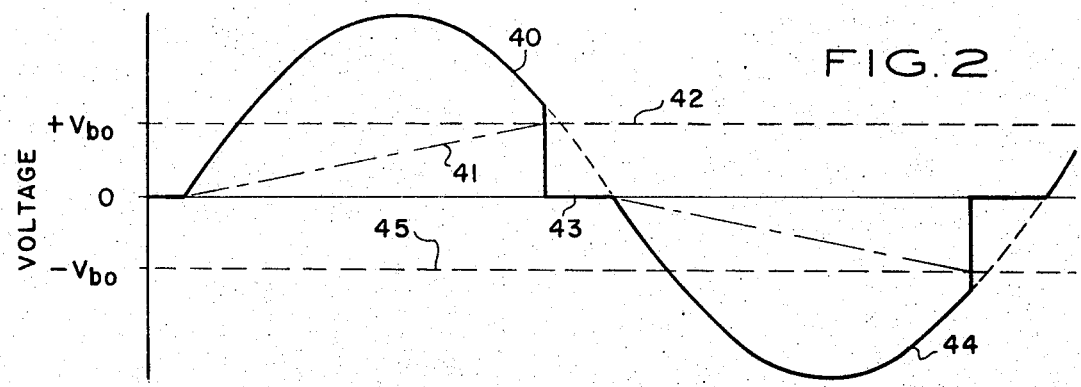
FIGS. 2 and 3 are waveforms used in explaining the operation of the FIG. 1 voltage regulator.

Referring to FIG. 2, there is shown a portion of the voltage waveform appearing between regulator terminals 25 and 27 for a first and relatively low operating speed of the vehicle motor, such waveform being represented by a solid line curve 40. At the beginning of the first half cycle (time = $t_o$), both the switching device 20 and the breakover device 32 are nonconductive and the capacitor 31 is discharged. As the voltage across magneto winding 11 increases, the capacitor 31 begins to charge up, the voltage thereacross increasing in a manner as approximately represented by broken line curve 41 of FIG. 2. This voltage buildup continues until the time $t_5$, at which time the voltage at junction 33 reaches the breakover level 42 of the breakover device 32. This triggers or renders the breakover device 32 conductive and the negative resistance characteristic thereof causes a sudden dumping of the charge on capacitor 31 into the gate electrode 23 of the switching device 20. This renders the switching device 20 conductive which, in turn, shorts out the magneto winding 11. Switching device 20 remains conductive until the magneto voltage goes to zero at the alternating-current zero crossing point at time $t_7$, as shown by the zero level notch 43 in FIG. 2, effectively reducing the R.M.S. voltage supplied to the load from the magneto. At this time, the switching device 20 and the breakover device 32 are turned off and the circuit is ready for the next half cycle.

Except for the differences in polarity and the direction of current flow, the operation during the negative half cycle 44 is the same as for the positive half cycle, devices 20 and 32 remaining nonconductive until the negative charge on capacitor 31 reaches the negative breakover level 45 of the device 32.

Figure 3:
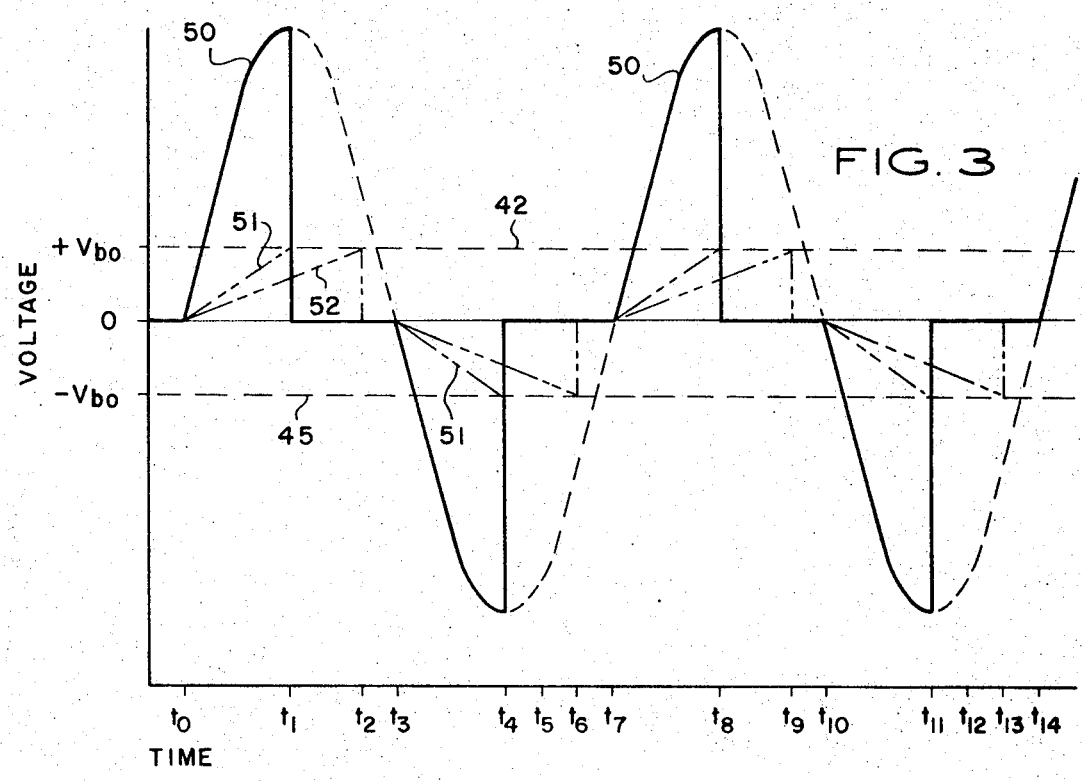

FIG. 3 shows the voltage waveform between regulator terminals 25 and 27 for a second and higher operating speed of the vehicle motor. Two cycles of the voltage waveforms are represented by solid line curve 50. The breakover levels for the breakover device 32 are denoted by the same reference numerals 42 and 45 since their values remain the same as in FIG. 2. For the higher operating speed depicted in FIG. 3, both the peak amplitude and the frequency of the alternating-current voltage across magneto winding 11 are increased. In the absence of regulation, the increase in peak amplitude would increase the R.M.S. value of the magneto winding voltage. Assuming that such an increase occurs, this increases the brightness of the lamp filament 28 which, in turn, reduces the resistance of photosensitive resistor 29. This enables the capacitor 31 to charge up faster. This charging voltage across capacitor 31 is represented by broken-line curve 51 in FIG. 3. The decrease in charging time is such that the breakover level of the breakover device 32 is reached at an earlier point in the half cycle. This turns on the switching device 20 at an earlier point during the half cycle (e.g., at time $t_1$ for the first half cycle in FIG. 3). The operation is such that the reduction in the "on" time for the magneto winding 11 output voltage offsets the increase in the peak value of such voltage so as to hold the root-mean-square value of such voltage substantially constant.

Broken-line curve 52 of FIG. 3 illustrates the reason why it is desirable for the regulator 10 to be controlled by the R.M.S. value of the magneto winding voltage, as opposed to the peak value of such voltage. Curve 52 represents the hypothetical case where the time constant of the time constant circuit means is controlled in accordance with the peak amplitude alone. An increase in peak amplitude would decrease the time constant, but would not decrease it enough to take into account the decrease in width of a half cycle because of the increase in frequency. Thus, even through the switching device 20 would be turned on quicker, it would still not be quick enough in view of the higher frequency. Consequently, there would be an insufficient change in the R.M.S. value to achieve the desired results.

Referring back to FIG. 2, it is desired that the regulator circuit 10 be constructed so that for the lowest typical operating speed the triggering of the breakover device 32 will occur at as late a point in each half cycle as is possible. This keeps noticeable flickering of the vehicle lamps to a minimum. This purpose is accomplished by making the breakover voltage level for the breakover device 32 as low as possible. This can be accomplished by proper selection of the specific type of breakover device which is used. Further assistance in achieving this objective can be obtained by using the technique shown in FIG. 1 and represented by the use of a gate controlled switching device 32 and a resistor 37 in the gate circuit thereof. In other words, the current supplied to the gate electrode 36 by way of resistor 37 serves to reduce the power electrode to power electrode breakover level of the device 32. If, however, the power electrode breakover level for the device 32 is sufficiently low without this added gate electrode biasing, then the resistor 37 can be omitted and the gate electrode 36 left disconnected. It all depends on the characteristics of the particular breakover device which is used and the requirements of the particular vehicle application being considered. In this regard, it is to be understood that the breakover device 32 need not take the form of a silicon bilateral switch. Thus, for example, semiconductor breakover diodes and silicon unilateral switches having the proper breakover characteristics may instead be used.

Figure 4:
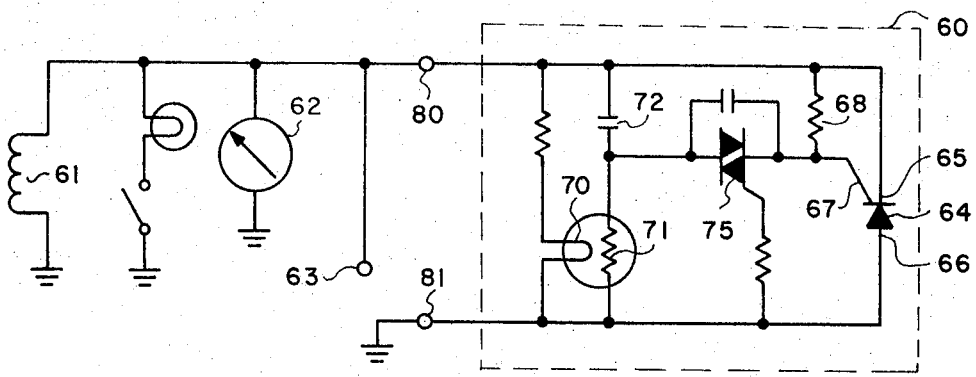
FIG. 4 shows a second embodiment of a voltage regulator constructed in accordance with the present invention.

Referring now to FIG. 4, there is shown a voltage regulator 60 for use with a magneto winding 61 for regulating the R.M.S. voltage output thereof. The voltage regulator 60 is particularly useful where a tachometer and a vehicle battery charger are driven from the magneto winding which is regulated. A tachometer is indicated at 62, while terminal 63 is, in use, connected to the vehicle battery charger. The construction of the FIG. 4 regulator circuit 60 is basically the same as that of the FIG. 1 embodiment with the major exception being that a silicon controlled rectifier 64 is used in place of the bilateral switching device 20 of the earlier embodiment. As such, the power electrodes of the device 64 are represented by a cathode 65 and an anode 66, while the control electrode of the device 64 is represented by a gate electrode 67. If the silicon controlled rectifier 64 is of the "sensitive gate" type, it is desirable that a resistor 68 be connected across its gate-cathode circuit to protect against random firing due to noise.

Figure 5:
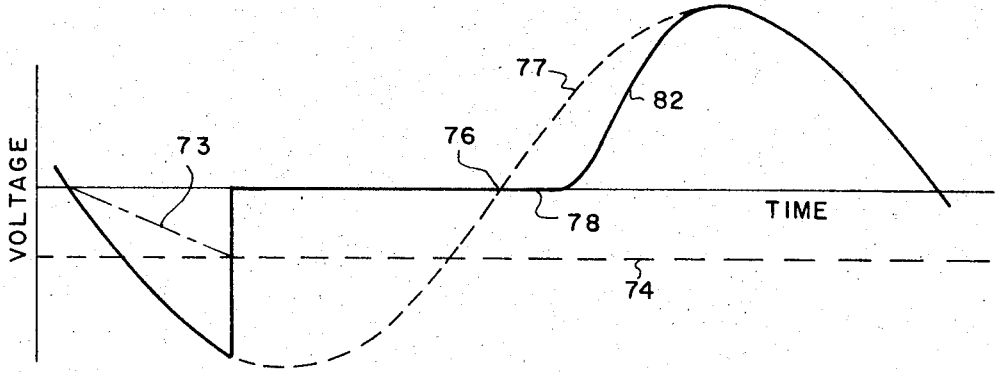
FIG. 5 is a waveform used in explaining the operation of the FIG. 4 voltage regulator.

The silicon controlled rectifier 64 is a unilateral device. Consequently, for a preliminary and simplified understanding of the matter, the magneto winding 61 can be thought of as being shorted out by such device 64 only during half cycles of a particular polarity, such device 64 remaining non-conductive during the half cycles of the opposite polarity. As in the earlier embodiment, an incandescent lamp filiment 70 and a photosensitive resistor 71 sense the R.M.S. value of the magneto winding voltage and adjust the time constant of the time constant circuit formed by resistor 71 and a capacitor 72 accordingly. Referring to FIG. 5, capacitor 72 charges up as indicated approximately by broken line curve 73. When the voltage across capacitor 72 reaches the breakover level 74 of the breakover device 75, such device 75 fires which, in turn, triggers the silicon controlled rectifier 64 to render same conductive. In theory, the device 64 would be expected to remain conductive until the zero axis crossing point 76 for the magneto winding voltage is reached and thereafter to remain non-conductive for the entire duration of the positive-going half cycle indicated at 77 in FIG. 5. In practice, however, the silicon controlled rectifier 64 remains conductive for an initial portion of the positive-going half cycle, as indicated at 78. This is believed to be caused by the collapsing magnetic field in the magneto winding 61, the EMF produced by such collapsing field serving to delay the actual zero axis crossing for the magneto winding voltage.

A typical cycle of the actual voltage waveform appearing between regulator terminals 80 and 81 is represented by the solid line curve 82 in FIG. 5. The initial fraction of the positive-going half cycle during which the silicon controlled rectifier 64 remains conductive because of the collapsing field effect is dependent upon and varies with the point during the negative half cycle at which the breakover device 75 fires. Thus, while the silicon controlled rectifier 64 modulates the conduction time during the negative-going half cycle, there is at the same time some residual modulation of the conduction time during the positive-going half cycle. Though not shown in FIGS. 2 and 3, this residual modulation effect also occurs for the FIG. 1 embodiment. In other words, though not shown in FIGS. 2 and 3, it is to be understood that in practice the bilateral switching device 20 also remains conductive during an initial portion of each half cycle.

Figure 6:
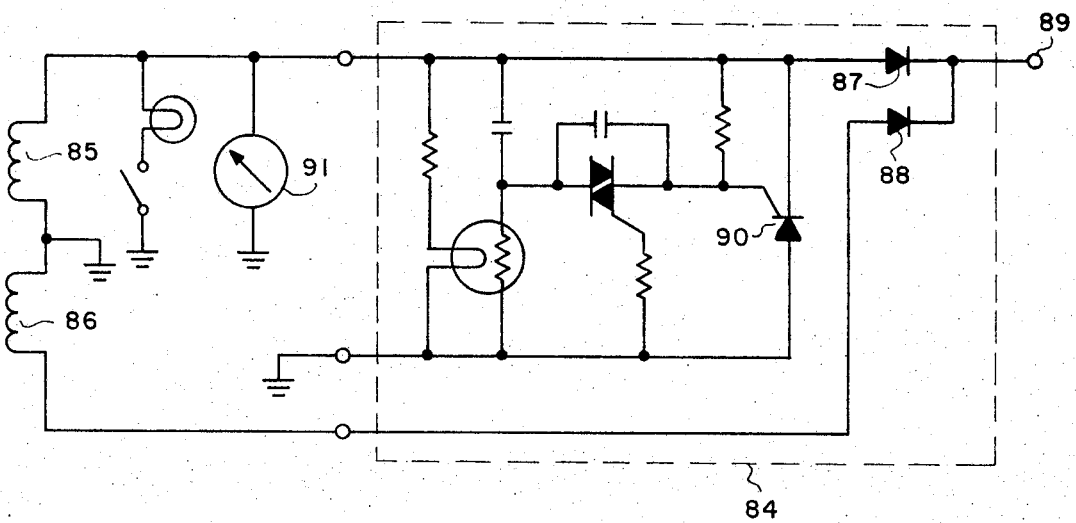
FIG. 6 shows a third embodiment of a voltage regulator constructed in accordance with the present invention.

Referring now to FIG. 6, there is shown a voltage regulator circuit 84 for use with a magneto having magneto windings 85 and 86. Regulator circuit 84 is basically the same as regulator circuit 60 of FIG. 4 except that, in the FIG. 6 case, a pair of semiconductor diodes 87 and 88 are included in the regulator package for enabling proper full-wave rectification of the voltage across magneto windings 85 and 86. The anode of diode 87 is connected to the upper end of magneto winding 85, while the anode of diode 88 is connected to the lower end of magneto winding 86. The cathodes of both of diodes 87 and 88 are connected to output terminal 89 which, in use, is connected to the battery charger unit for the vehicle battery.

The relative polarities with which the diode 87 and the silicon controlled rectifier 90 are connected are significant. In particular, the diode 87 is poled so that it passes the half cycles which are opposite in polarity to the half cycles which are shorted out by the silicon controlled rectifier 90. For the FIG. 5 example, diode 87 passes the positive-going half cycles, while silicon controlled rectifier 90 works on the negative-going half cycles. A similar consideration applies for the tachometer 91. Such tachometer 91 should be constructed so that it uses the opposite polarity half cycles from those which are being controlled by the silicon controlled rectifier 90. In both cases, this is desirable because the opposite polarity half cycles undergo less variation in wave shape as the speed of the vehicle motor is varied.

While there has been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A voltage regulator for an alternating voltage source having a substantial source impedance under short circuit conditions comprising:
   a first semi-conductor switching device having a pair of power electrodes and a control electrode;
   means for connecting the switching device by its power electrodes in shunt with the voltage source;
   root-mean-square voltage sensing means coupled in shunt with the power electrodes of the switching device for producing a control effect which varies with the root-mean-square value of the voltage developed by the voltage source;
   and a semi-conductor break over device coupled between the root-mean-square voltage sensing means and the control electrode of the switching device and responsive to the control effect produced by an increase in the root-mean-square value of the voltage developed by the voltage source for causing the switching device to trigger and become conductive earlier in at least one half cycle of each cycle of the voltage.

2. A voltage regulator in accordance with claim 1 wherein the root-mean-square voltage sensing means includes:
   electrically responsive radiant energy producing means coupled in shunt with the power electrodes of the switching device;
   and time constant circuit means coupled in shunt with the power electrodes of the switching device and including radiant energy responsive variable impedance means responsive to the radiant energy produced by the radiant energy producing means;
   and wherein the breakover device is coupled between the time constant circuit means and the control electrode of the switching device.

3. A voltage regulator in accordance with claim 2 wherein the radiant energy producing means comprises incandescent lamp means, the radiant energy is light energy and the radiant energy responsive variable impedance means is formed of a photosensitive material.

4. A voltage regulator in accordance with claim 2 wherein the time constant circuit means includes a capacitor coupled in series with the radiant energy responsive variable impedance means and one side of the breakover device is coupled to the junction between the capacitor and the impedance means and the other side of the breakover device is coupled to the control electrode of the switching device.

5. A voltage regulator in accordance with claim 1 wherein the breakover device is a semiconductor switching device having a negative resistance characteristic.

6. A voltage regulator in accordance with claim 2 wherein:
   the radiant energy producing means comprises incandescent lamp means;
   the radiant energy is light energy;
   the radiant energy responsive variable impedance means is formed of a photosensitive material;
   the time constant circuit means includes a capacitor coupled in series with the photosensitive variable impedance means;
   and the breakover device is a semiconductor switching device having a negative resistance characteristic and having one side thereof coupled to the junction between the photosensitive variable impedance means and the capacitor and having the other side thereof coupled to the control electrode of the first switching device.

7. A voltage regulator in accordance with claim 2 wherein the breakover device is a semiconductor switching device having a pair of power electrodes and a control electrode, such breakover device having one power electrode thereof coupled to the time constant circuit means, the other power electrode thereof coupled to the control electrode of the first switching device and the control electrode thereof coupled to one of the power electrodes of the first switching device.

8. A voltage regulator in accordance with claim 7 wherein the circuit connection between the control electrode of the breakover switching device and the power electrode of the first switching device includes resistor means for modifying the breakover level of the breakover switching device.

9. A voltage regulator in accordance with claim 1 and including capacitor means coupled in shunt with the breakover device for minimizing spurious operation thereof.

10. A voltage regulator in accordance with claim 2 and including adjustable resistor means coupled in series with the radiant energy producing means for enabling adjustment of the set point of the voltage regulator.

11. A voltage regulator in accordance with claim 1 wherein the semiconductor switching device is a bilateral switching device.

12. A voltage regulator in accordance with claim 1 wherein the semiconductor switching device is a silicon controlled rectifier.

13. A voltage regulator in accordance with claim 12 and including resistor means connected between the control electrode and one of the power electrodes of the silicon controlled rectifier.

* * * * *